(12) United States Patent
Nicolau et al.

(10) Patent No.: US 10,335,982 B2
(45) Date of Patent: *Jul. 2, 2019

(54) BEAD IMMOBILISATION METHOD AND BEAD ARRAYS MADE THEREBY

(71) Applicant: SWINBURNE UNIVERSITY OF TECHNOLOGY, Victoria (AU)

(72) Inventors: Dan Veniamin Nicolau, Liverpool (GB); Luisa Filipponi, Aarhus (DK); Prashant Dnyandeo Sawant, Melbourne (AU)

(73) Assignee: SWINBURNE UNIVERSITY OF TECHNOLOGY, Victoria (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/448,256

(22) Filed: Mar. 2, 2017

(65) Prior Publication Data
US 2017/0232646 A1    Aug. 17, 2017

Related U.S. Application Data

(63) Continuation of application No. 12/306,519, filed as application No. PCT/AU2007/000895 on Jun. 27, 2007, now Pat. No. 9,586,346.

(30) Foreign Application Priority Data

Jun. 28, 2006  (AU) ................. 2006903471

(51) Int. Cl.
| | | |
|---|---|---|
| *B29C 39/10* | (2006.01) | |
| *B29C 39/26* | (2006.01) | |
| *B29C 39/00* | (2006.01) | |
| *B29L 31/00* | (2006.01) | |

(52) U.S. Cl.
CPC ............ *B29C 39/10* (2013.01); *B29C 39/003* (2013.01); *B29C 39/26* (2013.01); *B29L 2031/756* (2013.01)

(58) Field of Classification Search
CPC ................................ B29D 16/00; B29C 39/10
USPC ........................................................... 506/9
See application file for complete search history.

(56) References Cited

U.S. PATENT DOCUMENTS

| | | |
|---|---|---|
| 6,396,995 B1 | 5/2002 | Stuelpnagel et al. |
| 6,908,760 B2 | 6/2005 | Cima et al. |
| 7,247,349 B2 | 7/2007 | Ozin et al. |
| 2002/0050220 A1 | 5/2002 | Schueller et al. |
| 2003/0129654 A1 | 7/2003 | Ravkin et al. |
| 2004/0224321 A1 | 11/2004 | Nicolau et al. |
| 2004/0235406 A1 | 11/2004 | Duescher |

(Continued)

OTHER PUBLICATIONS

CDKitchen, "Mini Pineapple Upside-Down Cakes," published on Oct. 8, 2014, retrieved from http://www.cdkitchen.com/reci pes/recs/167/MiniPineappleUpsideDownCak61966.shtml, on Jan. 14, 2014, 3 pages.

(Continued)

*Primary Examiner* — Karla A Dines
(74) *Attorney, Agent, or Firm* — Seed IP Law Group LLP (57) ABSTRACT

A bead immobilization method including receiving at least one bead in at least one well in a casting surface, and casting a casting material over the casting surface to form a reverse casting in which the at least one bead is cast onto at least one post upstanding from a surface of the reverse casting.

22 Claims, 10 Drawing Sheets (56) References Cited

U.S. PATENT DOCUMENTS

2006/0068447 A1    3/2006  Banerjee et al.
2007/0127164 A1*  6/2007  Ofek .................. B82Y 5/00
                                                              360/324

OTHER PUBLICATIONS

Choi et al., "A Photocurable Poly(dimethylsiloxane) Chemistry Designed for Soft Lithographic Molding and Printing in the Nanometer Regine," *J. Am. Chem. Soc.* 125:4060-4061, 2003.
Jensen-McMullin et al., "Fiber Optic-Based Optical Trapping and Detection for Lab on a Chip (LOC) Applications," *Proceedings of SPIE* 4622:188-194, 2002.

* cited by examiner

BEAD IMMOBILISATION METHOD AND BEAD ARRAYS MADE THEREBY

BACKGROUND

Technical Field

The present disclosure relates to a bead immobilization method and bead arrays made thereby.

Description of the Related Art

Nanoarrays and microarrays used in the biotechnology, pharmaceutical, and medical industries are generally formed by immobilizing reactive and sensing chemical entities on substrates in spatially addressable arrays. Conventional immobilization technologies for forming such arrays can be broadly categorized as photolithography and spotting technologies.

Photolithography technology synthesizes arrays of chemically modified sites in situ on substrates using photolithography and combinatorial chemistry. Problems with this immobilization technology are the expense, complexity, and time associated with multiple irradiation, masking, and chemical reaction steps.

Spotting technology deposits droplets of chemical reactive/sensing solution over the surface of a substrate or into wells formed in the substrate. Problems with this immobilization technology are poor precision and reproducibility, and low signal-to-noise ratio. Droplets on the surface of the substrate can interfere with adjacent spots causing contamination. The density and uniformity of each spot is not easily controlled. A solidifying agent around the perimeter of a spot portion can cause non-specific adsorption of droplets on the substrate and decrease the signal-to-noise ratio. The signal-to-noise ratio of luminescence from surface spots or droplets confined in wells is reduced by the background noise of luminescence from the substrate itself.

A need therefore exists for an immobilization technology for forming nanoarrays and microarrays that is generic, simple, and low cost, yet has improved precision, reproducibility, and sensitivity.

BRIEF SUMMARY

According to the present disclosure, there is provided a bead immobilization method that includes receiving at least one bead in at least one well in a casting surface, and casting a casting material over the casting surface to form a reverse casting in which the at least one bead is cast onto at least one post upstanding from a surface of the reverse casting.

The at least one bead can be selected from a microparticle, a microsphere, a nanoparticle, a nanosphere, and combinations thereof.

The at least one well can be a microwell, and the at least one post can be a micropost.

The at least one bead, at least one well, or the at least one post or a combination thereof can be functionalized with functions selected from interacting, reacting, binding, sensing, detecting, identifying, labeling, and combinations thereof. The at least one bead or the at least one well or both can be functionalized before or during the casting step, and the at least one bead or at least one post or both can be functionalized during or after the casting step or both during and after the casting step.

The at least one well can have a vertical cross-sectional shape selected from a V-shape, a U-shape, and a squared U-shape. The at least one post can have a vertical cross-sectional shape that is the reverse shape of the vertical cross section of the at least one well.

The receiving step can include receiving a plurality of beads in a plurality of wells in the casting surface so that the casting step forms a reverse casting having a plurality of beads distributed on a plurality of posts. The plurality of beads can be equal to, greater than or less than the plurality of wells, and hence the plurality of beads can be equal to, greater than or less than the plurality of posts.

The plurality of beads distributed on the plurality of posts can form an array of beads on posts, or a bead-on-post array.

The receiving step can be performed by random or directed depositing of the plurality of beads in the plurality of wells.

The spatial distribution of respective functionalized or unfunctionalized beads in the array can be a spatial code for identifying or reading the array or both identifying and reading the array.

The present disclosure also provides a bead-on-post array made by the above reverse casting method.

The elevation of beads on posts above the surface of the array can enhance a detection signal-to-noise ratio of the array or its beads or both.

BRIEF DESCRIPTION OF THE SEVERAL VIEWS OF THE DRAWINGS

The present disclosure will now be described by way of example only with reference to the accompanying drawings, in which.

DETAILED DESCRIPTION

Figures 1A, 1B:
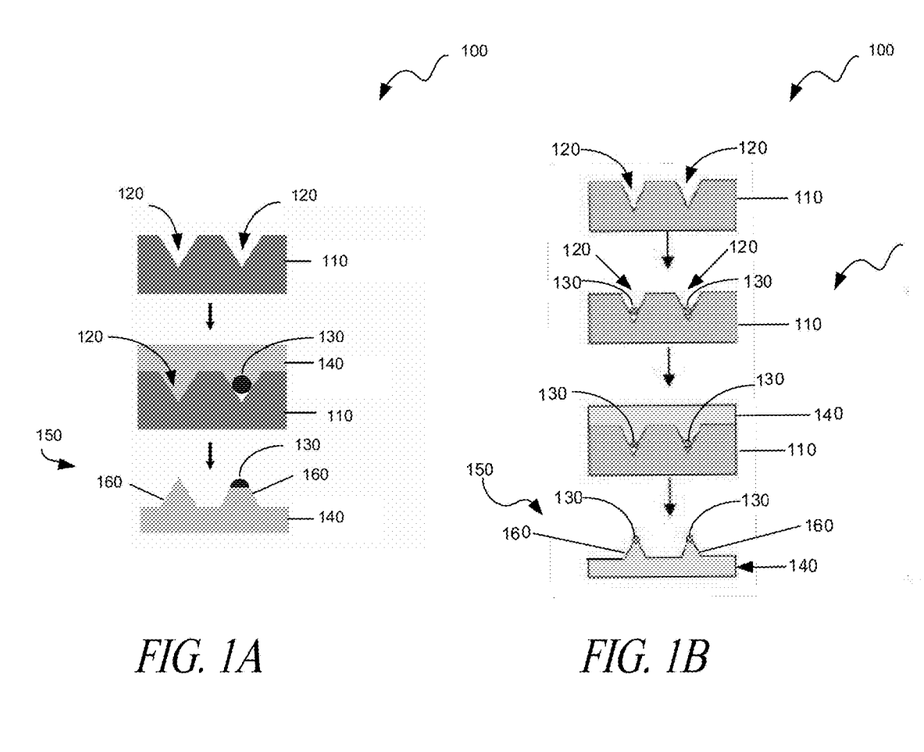
FIGS. 1A, 1B, and 1C are schematic diagrams of a bead immobilization method using reverse casting of beads onto posts.
Figure 1C:
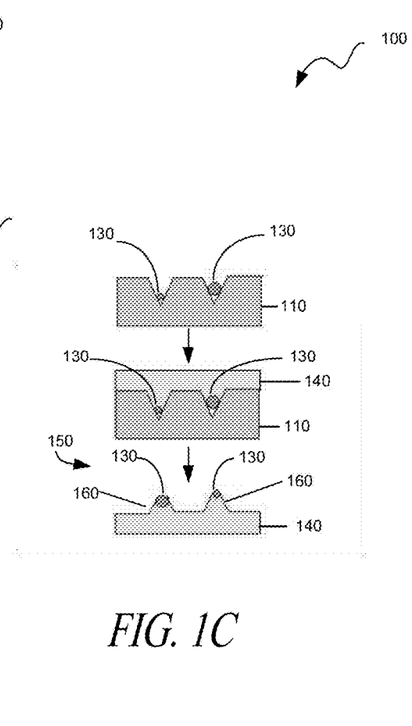

FIGS. 1A, 1B, and 1C are simplified examples of a bead immobilization method 100 using reverse casting on a casting surface 110 having microwells 120. Microbeads 130 are first received in the wells 120, and then a casting material 140 is cast over the casting surface 110 to form a reverse casting 150 in which the beads 130 are cast onto microposts 160 upstanding from a surface of the reverse casting 150.

FIG. 1C illustrates that varying the size of the beads 130 relative to the depth of the wells 120 influences the height of the posts 160, and hence the elevation of the beads above the surface of the reverse casting 150.

Figure 2A:
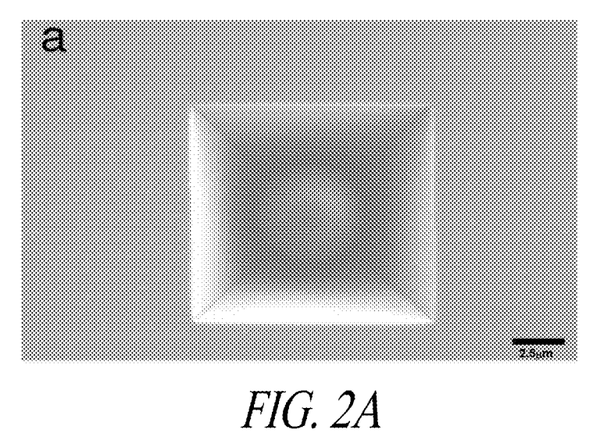
FIGS. 2A and 2B are microscopic images of a bead in a well, and a reverse casting of a bead on a post, respectively.
Figure 2B:
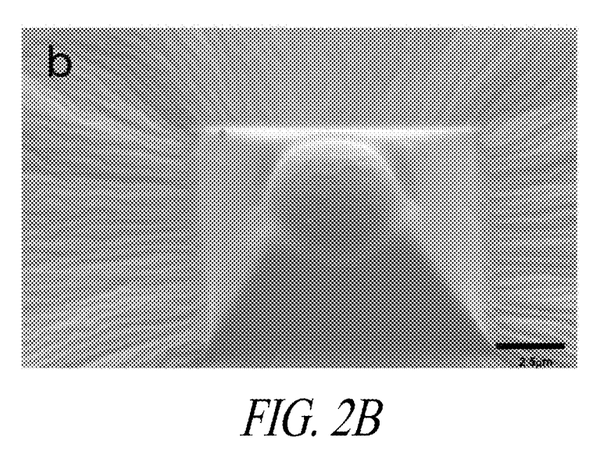
Figure 3A:
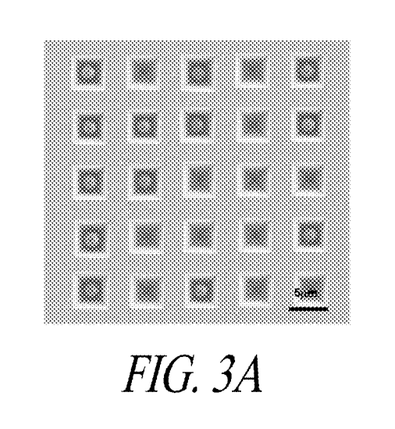
FIGS. 3A and 3B are microscopic images of beads in an array of wells, and a reverse casting of a bead-on-post array, respectively.
Figure 3B:
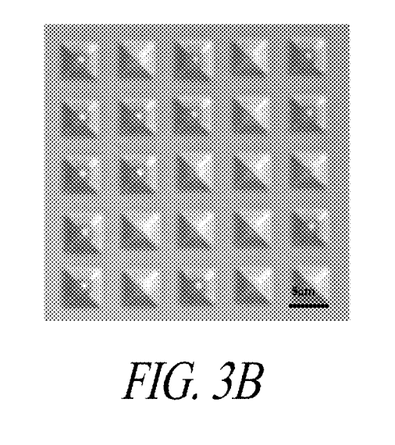
Figure 4A:
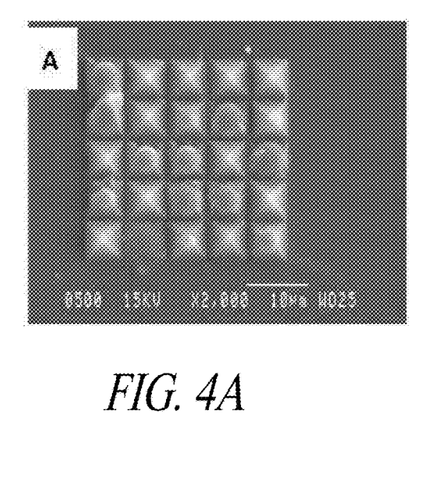
FIGS. 4A, 4B, and 4C are microscopic close-up images of a bead-on-post array.
Figure 4B:
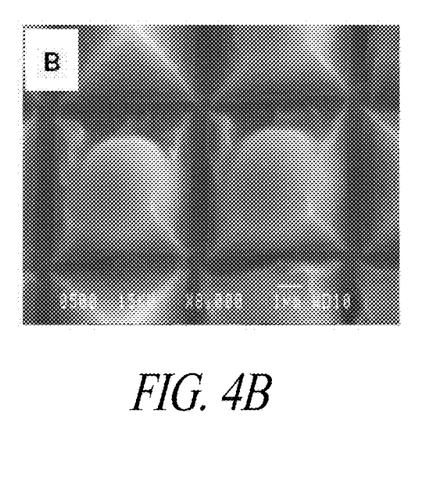
Figure 4C:
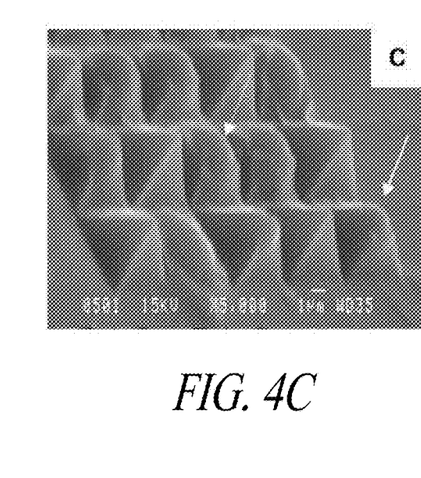

FIG. 2A is a microscopic close-up of a microbead in a microwell before reverse casting, and FIG. 2B is a microscopic close-up of the microbead on a micropost after reverse casting. FIG. 3A illustrates a plurality of beads randomly received into a grid array of wells in a casting surface, and FIG. 3B illustrates the resultant reverse casting having a grid array of beads on posts (or a bead-on-post array). FIGS. 4A, 4B and 4C are microscopic close-ups of a bead-on-post microarray.

In the illustrated embodiments the wells, and hence the posts, are partially occupied by beads. The beads can occupy the wells, and hence the posts, in ordered or arbitrary patterns. It will be appreciated that bead/well occupancy can be controlled by varying the relative shapes and sizes of the beads and wells, and the manner in which the beads are received in the wells. In the illustrated embodiments, individual wells/posts are occupied by zero or single beads. It will also be appreciated that individual wells/posts can be occupied by zero, single or multiple beads, and that the bead/well/post packing density can be controlled by varying the shape and size of the beads and wells, and the manner in which the beads are received in the wells. For example, the reverse casting of clusters of beads onto individual posts is discussed below.

Beads can be received in wells by random or directed depositing of them in the wells. For example, beads can be randomly deposited in wells by spin coating a colloidal solution of beads over the casting surface. The spatial distribution of the beads received in the wells can be influenced by selectively varying parameters selected from the angular spinning speed, the frequency and duration of the spin coating, the concentration of the colloidal solution, the shape and size of the beads, and the shape, width, depth and mutual spacing of the wells. Alternatively, beads can be directed into wells using needles, microfluidic structures, masks, templates, applied electric forces, electrostatic self-assembly, magnetic forces, laser tweezers, etc. The spatial distribution of beads in wells, and hence on posts, can be a random or ordered pattern depending on whether the beads are received in wells by random or directed depositing.

In use, the elevation of the beads above the planar surface of the array advantageously enables enhanced detection or discrimination of the beads. For example, when a confocal microscope is used to read a bead-on-post array based on fluorescence, the fluorescence of the beads is read at the height of the post thereby suppressing residual fluorescence from the surface of the array. The bead-on-post arrays therefore have enhanced detection signal-to-noise ratios, for example, enhanced optical detection signal-to-noise ratios.

The microwells in the illustrated embodiments are generally V-shaped in vertical cross section, and the inversely-shaped microposts have a generally inverted V-shaped vertical cross section. It will be appreciated that the disclosed embodiments can be implemented with wells having other vertical cross sections, for example, U-shapes and squared U-shapes, and with posts having inversely shaped vertical cross sections, for example, inverted U-shapes, inverted squared U-shapes, etc. In addition, the horizontal cross section of the wells, and hence the posts, can be any two-dimensional shape sufficient to respectively receive and support beads. It will further be appreciated that the disclosure is not limited to these shapes and that reverse casting can be implemented with wells and reverse-shaped posts having any complementary three-dimensional geometries that are suitable for respectively receiving and supporting beads. For example, the reverse cast microposts can be, without limitation, generally conical, pyramidal, cylindrical, and rectangular.

The beads can be microparticles, microspheres, nanoparticles, nanospheres, and combinations thereof made from glass, plastic, ceramics, magnetic material, and combinations thereof. The beads, wells and posts can be functionalized with functions selected from interacting, reacting, binding, sensing, detecting, identifying, labeling, and combinations thereof. The beads or the wells or both can be functionalized, individually or together, before reverse casting, while the beads and posts can be functionalized, individually or together, during or after reverse casting or both.

Depending on the selected functionality of the bead-on-post array, the beads can have a chemical modification selected from a receptor, a carbohydrate, a dendrimer, a chemical functional group, a chemical molecule, a detection label, a luminescent tag, a color tag, quantum dots, a metal nanoparticle, a phosphor label, a redox active probe a biological molecule, nucleic acid, DNA, an enzyme, a protein, an antibody, a micro-organism, RNA, oligonucleotides, and fragments or combinations thereof. Depending on the selected functionality, the beads can be selectively chemically-modified before being received in the wells, on the posts, and combinations thereof. Depending on what functional beads are selected, the functionality of the bead-on-post array can be selected from a biochip, an oligonucleotide array, a nucleic acid array, a DNA array, an RNA array, a peptide array, a carbohydrate array, a dendrimer array, a protein array, a cell array, and combinations thereof.

The casting surface can be a mold or a template made from a rigid substrate material selected from a polymer material, an inorganic material, a silicon material, a quartz material, a glass material, and combinations thereof. For example, the mold can be a silicon substrate master. The microwells can be formed in the mold using conventional techniques, for example, lithography or etching. The mold can be re-used to enable reproduction or replication of the bead-on-post microarray with different spatial distributions of unfunctionalized and functionalized beads and different spatial distributions of different functionalized beads.

The casting material can be selected from a polymeric material, a polymerization initiator, a polymerization catalyst, an inorganic precursor, a metal precursor, and combinations thereof. For example, the casting material can be polydimethylsiloxane (PDMS).

Figure 5A:
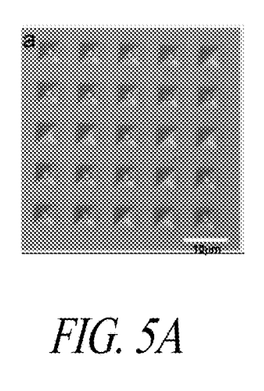
FIGS. 5A, 5B, and 5C are microscopic images of different spatial codes of functionalized beads on bead-on-post arrays.
Figure 5B:
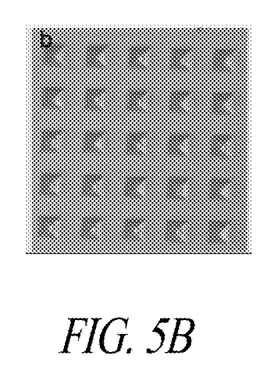
Figure 5C:
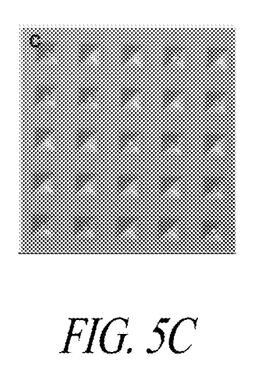

The spatial distributions or positions of different functionalized or unfunctionalized beads can represent spatial addresses on the bead-on-post array. The spatial addresses can represent a spatial code for self-identifying or reading the array. FIGS. 5A, 5B, and 5C are microscopic images of different spatial codes of functionalized beads on different bead-on-post arrays Spatial codes of bead-on-post arrays can be conferred a priori with directed depositing, or a posteriori with random depositing. When the beads are received in the wells by directed depositing, the spatial code of the bead-on-post array can be at least partially predetermined before reverse casting. Alternatively, when the beads are received in the wells by random depositing, the spatial addresses or the spatial code can be determined after reverse casting using label-based detection methods or label-free detection of individual immobilized beads. Label-based detection can involve the use of any conventional technologies for detecting labels or other functions associated with individual immobilized beads, for example, fluorescence, enhanced fluorescence using dendrimer or quantum dot technology or combination thereof, phosphorescence, electrochemical detection, metal-nanoparticle based detection, for instance using silver-enhanced imaging, surface plasmon resonance imaging, light scattering, surface enhanced Raman spectroscopy, photo-thermal imaging, electrochemical detection, scanning electrochemical microscopy, and calorimetric change. Label-free detection can involve the use of any conventional technologies for detecting intrinsic properties of individual immobilized beads, for example, image null ellipsometry, image surface plasmon resonance, mass spectroscopy, time-of-flight secondary mass spectroscopy, and intrinsic UV fluorescence.

Figure 6A:
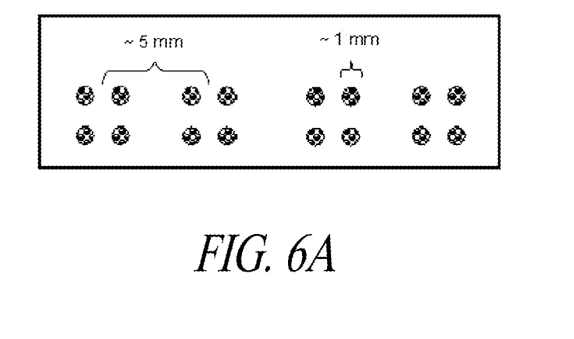
FIG. 6A is a schematic of an array of functionalized bead clusters on posts, and FIG. 6B are microscopic close-up images of functionalized bead clusters on posts.
Figure 6B:
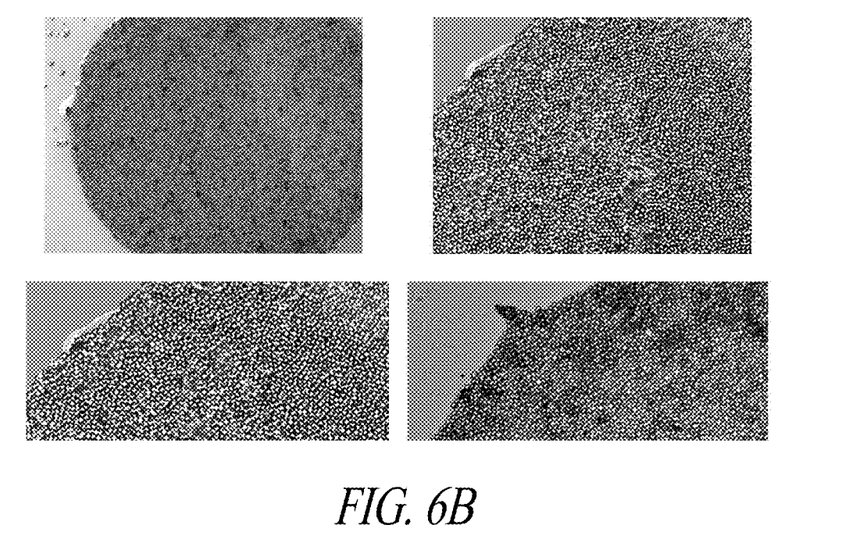

Clusters of functionalized microbeads can be cast onto individual posts where the functionality of the bead-on-post array requires individual functionalized areas larger than about 0.5 mm in diameter. FIG. 6A illustrates a bead-on-posts array formed by reverse casting clusters of beads around 1 mm in diameter on posts in a 5×5 mm² grid pattern. FIG. 6B gives microscopic close-ups of immobilized bead clusters before and after sonication. Individual microbeads in the bead cluster are approximately 2 μm in diameter.

The embodiments have been described by way of example only and modifications are possible within the scope of the disclosure disclosed.

The following examples are to be understood as illustrative only. They should therefore not be construed as limiting the disclosure in any way.

Example 1

Figure 7:
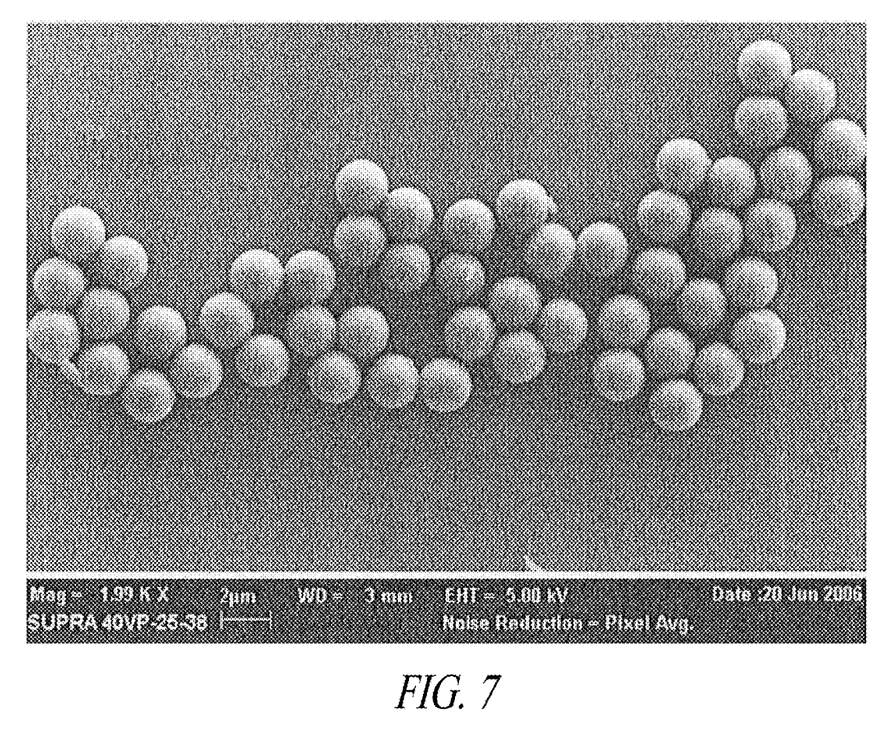
FIG. 7 is a microscopic image of beads before reverse casting.

A bead microarray was fabricated for protein immobilization by covalent binding using amino-terminated microbeads. The beads employed were melamine amino-terminated microspheres ($NH_2$-microspheres) characterized by a high and uniform ligand density ($12.6 \times 10^6$ amino groups per microsphere). The beads were spherical, uniform in dimension (2 μm), and had a limited tendency to aggregate, as shown in the SEM image of FIG. 7. The use of diluted solution of beads (0.04% w/v), and gentle vortexing prior to their use, limited the formation of aggregates.

A $NH_2$-bead microarray was fabricated using the general method described above. Specifically, a water solution of the $NH_2$-beads was spin coated over a silicon master mold with a series of 25 V-shaped microwells arranged in a 5×5 grid pattern. During spin coating, the $NH_2$-beads were randomly distributed in the wells of the master. Spin coating was repeated three times to ensure a good coverage, and the silicon master was pressed with a flat piece of PDMS between each coating step to remove beads disposed on the flat surfaces of the master between the microwells. PDMS pre-polymer was then poured over the silicon master, cured in an oven where it solidified, and peeled away from the master which was retained for re-use. The relative dimensions of the wells and the microbeads influence how many beads will be deposited in the array. In this example, the silicon master contained 25 wells 4 μm wide and 3 μm deep (measured in the middle of the inverted pyramid). For this type of array, an average of 13±3 microbeads were randomly deposited in, and distributed between, the 25 wells.

A bead-on-post microarray containing 12 entrapped beads was tested for its stability. Specifically, the $NH_2$-bead microarray was exposed to extensive sonicating to assess the mechanical stability of the trapped beads. Different media were used and sonication was done for 5, 10, and 20 minutes. The media chosen were the ones commonly used when performing protein immobilization (aqueous buffers) and when cleaning the substrate (ethanol), including an (unlikely to be used) organic solvent (acetone). Out of the 12 beads forming the array, no bead detached from the PDMS mold, even after 20 minutes of sonicating.

Figure 8A:
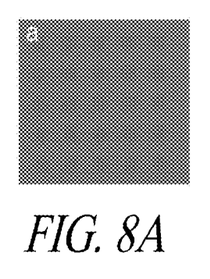
FIGS. 8A and 8B are fluorescent images of a bead-on-post array before and after interaction of functional beads in the array, respectively.
Figure 8B:
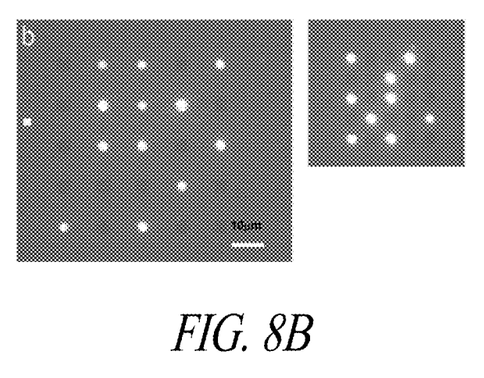

The reactivity of the amino-microbeads after the array fabrication was tested using an amino-reactive fluorophore; an array of glass beads was used as a control. FIGS. 8A and 8B are respective epi-fluorescence microscopy images after the reaction of the $NH_2$-bead microarray and the control glass-bead microarray. FIG. 8B illustrates that fluorescent beads were detected exclusively on the amino-functionalized array (not in the control), indicating their retained activity.

Figure 9A:
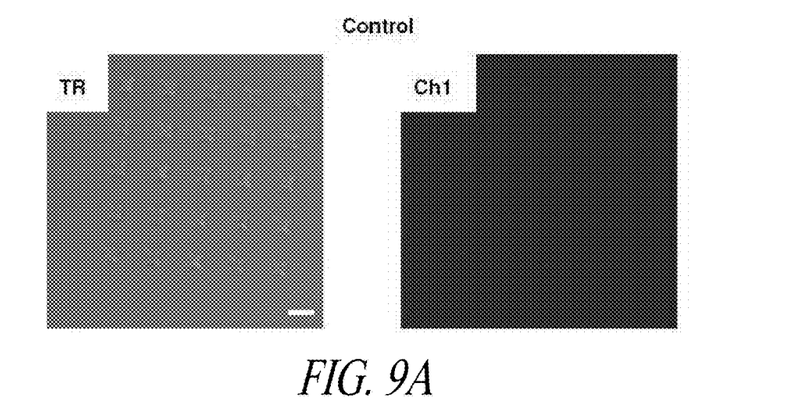
FIGS. 9A, 9B, and 9C are microscopic images of bead-on-post arrays with unfunctionalized beads, and beads functionalized to selectively bind streptavidin (FIG. 9C) and not anti-mouse IgG (FIG. 9B), respectively.
Figure 9B:
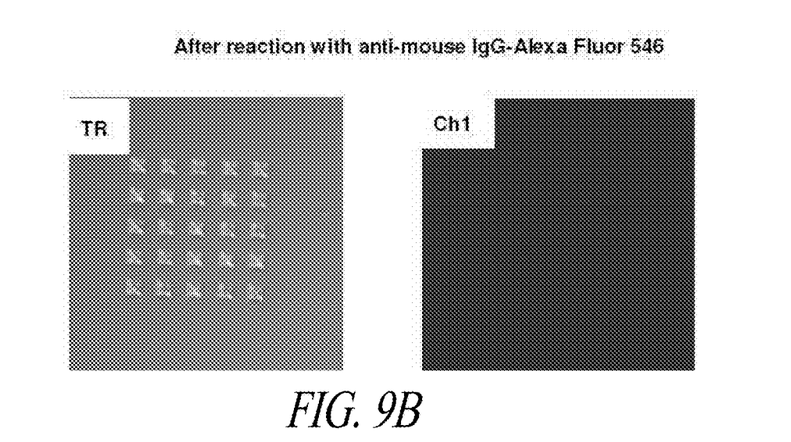
Figure 9C:
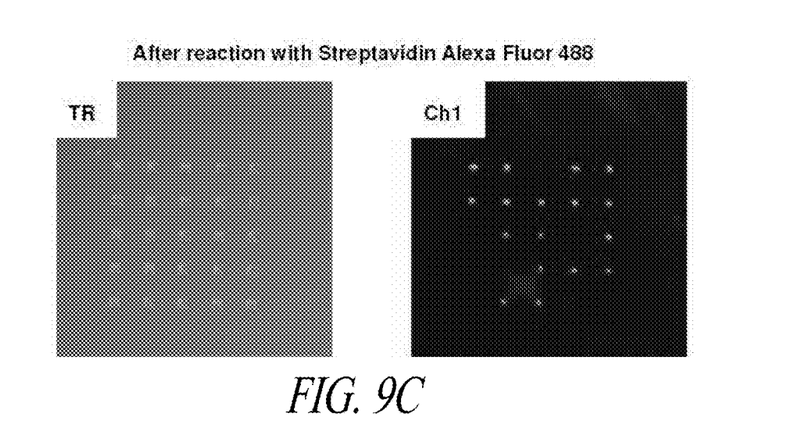

Proteins were selectively immobilized using a biorecognition ligand system, specifically biotin-streptavidin. These ligands are extremely specific and, at the same time, provide an immobilization that is similar in strength to covalent binding. Biotin-microspheres were synthesized by attaching a commercially available biotin ligand to the amino-terminated melamine microbeads. A biotin-bead-on-post microarray was then fabricated following the same procedure described above. To prevent non-specific attachment over the PDMS background surface, the biotin-bead-on-post microarray was blocked using a protein-resistant coating namely, bovine serum albumin (BSA). The biotin-bead-on-post microarray was tested against two proteins, namely streptavidin (the "target protein"), and anti-mouse IgG (a "control protein") which should not react with the biotin-bead-on-post microarray platform. The target and control proteins were respectively labeled with different fluorescent dyes, fluorescent in green in the case of streptavidin (FITC), and in red in the case of anti-mouse IgG (Alexa Fluor® 546). A biotin-bead-on-post microarray was also imaged as control. FIGS. 9A, 9B, and 9C illustrate that the recognition occurred only for the desired target protein, i.e., the FITC-labeled streptavidin (FIG. 9C).

Example 2

Figure 10A:
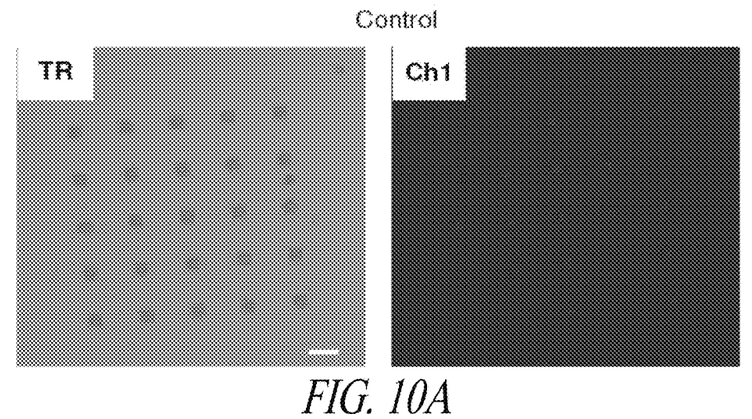
FIGS. 10A, 10B, and 10C are microscopic images of bead-on-post arrays with unfunctionalized beads, and beads functionalized to selectively bind anti-rabbit IgG (FIG. 10C) and not anti-mouse IgG (FIG. 10B), respectively.
Figure 10B:
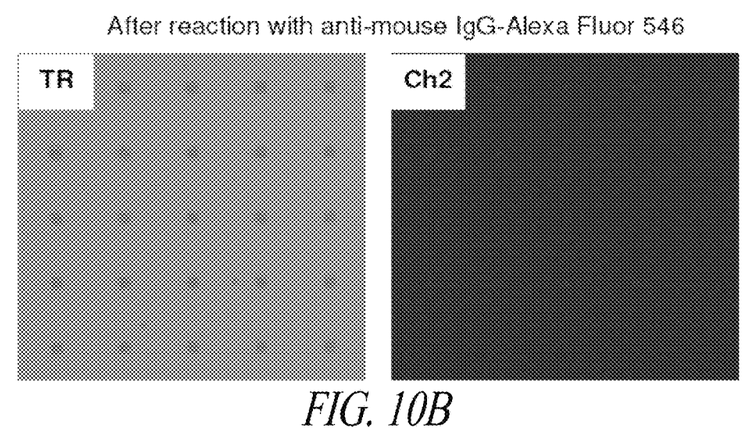
Figure 10C:
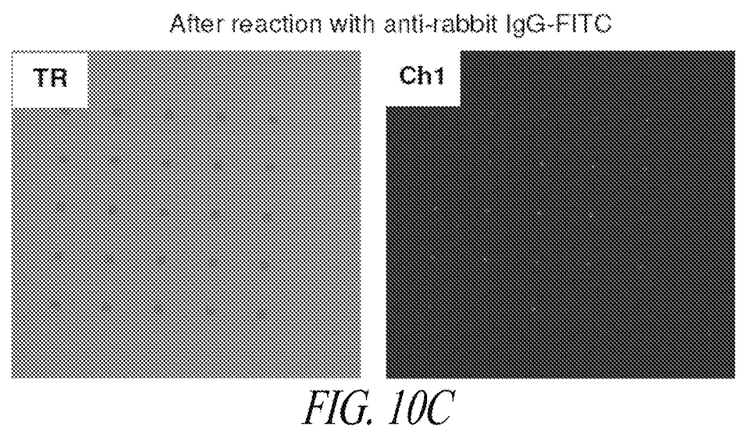

Proteins were also selectively immobilized using an immuno-based recognition system. Antibodies (rabbit IgG) were immobilized on beads by covalent binding using a commercially available heterobifunctional cross-linker (Sulfosuccinimidyl-4-(N-maleimidomethyl)cyclohexane-1-carboxylate). IgG could also be immobilized by physical adsorption. An antibody-bead-on-post microarray was then fabricated following the procedure described above. The antibody-bead-on-post microarray was blocked with BSA to prevent non-specific adsorption of proteins to the PDMS surface, as described above for the biotin-bead-on-post microarray. The antibody-bead-on-post microarray—was tested against anti-rabbit IgG (the "target protein") and against anti-mouse IgG ("control protein") which should not react with the rabbit IgG. The target and control proteins were labeled respectively with a green fluorescent dye (FITC) and a red fluorescent dye (Alexa Fluor® 546). A bead-on-post microarray with no antibodies attached to beads was also imaged as a secondary control. FIGS. 10A, 10B, and 10C illustrate that the immuno-based recognition occurred only for the desired target protein, i.e., the FITC-labeled anti-rabbit IgG (FIG. 10C).

The results of the above two examples indicate the following.

The biomolecular functionality in the microspheres is preserved during the fabrication process. This is illustrated by the retained capacity of biotin and rabbit IgG-conjugated beads to selectively bind streptavidin and anti-rabbit IgG respectively, and to not bind other proteins (anti-mouse IgG); blocking with BSA prior to incubating the bead-on-post microarray platforms with target proteins (streptavidin or anti-rabbit IgG) excludes immobilization of the target proteins over the microspheres through non-specific adsorption.

The fluorescent arrays have excellent optical detection signal-to-noise ratios (mean spot intensity/background standard deviation=80 to 100).

Geometric or spatial codes are clearly visible in FIGS. 9C and 10C, thus demonstrating the encoding capability of the bead microarray platform.

The bead immobilization method of the present disclosure, and the bead-on-post arrays made thereby, are not limited to the above examples. Embodiments of the present disclosure provide a simple, generic, sensitive, precise and reproducible method of forming bead-on-post nanoarrays or microarrays having conventional functionalities selected from interacting, reacting, binding, sensing, detecting, identifying, labeling, and combinations thereof.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A bead immobilization method, comprising: receiving at least one bead in at least one well in a casting surface, and casting a casting material over the casting surface to form a reverse casting in which the at least one bead is cast onto at least one post upstanding from a surface of the reverse casting.

2. The method of claim 1, wherein the at least one bead is selected from a microparticle, a microsphere, a nanoparticle, a nanosphere, and combinations thereof.

3. The method of claim 1, wherein the at least one well is a microwell, and the at least one post is a micropost.

4. The method of claim 1, wherein the at least one bead, or the at least one well, or the at least one post or a combination thereof are functionalized with functions selected from interacting, reacting, binding, sensing, detecting, identifying, labeling, and combinations thereof.

5. The method of claim 1, wherein the at least one bead or the at least one well or both are functionalized before or during the casting step, and the at least one bead or at least one post or both are functionalized during or after the casting step.

6. The method of claim 1, wherein the at least one well has a vertical cross-sectional shape selected from a V-shape, a U-shape, and a squared U-shape.

7. The method of claim 6, wherein the at least one post has a vertical cross-sectional shape that is the reverse shape of the vertical cross section of the at least one well.

8. The method of claim 1, wherein the receiving step includes receiving a plurality of beads in a plurality of wells in the casting surface so that the casting step forms a reverse casting having a plurality of beads distributed on a plurality of posts.

9. The method of claim 8, wherein the plurality of beads is equal to, greater than or less than the plurality of wells, and hence the plurality of beads is equal to, greater than or less than the plurality of posts.

10. The method of claim 8, wherein the plurality of beads distributed on the plurality of posts forms an array of beads on posts, or a bead-on-post array.

11. The method of claim 10, wherein the spatial distribution of functionalized and unfunctionalized beads on posts in the array is a spatial code for identifying and reading the array.

12. The method of claim 8, wherein the receiving step is performed by random or directed depositing of the plurality of beads in the plurality of wells.

13. A bead-on-post array made by the method of claim 1, wherein the at least one bead cast onto at least one post is partially embedded into the casting material forming the post to immobilize the at least one bead.

14. The array of claim 13, wherein an elevation of beads on posts above the surface of the array enhances a detection signal-to-noise ratio of the array or its beads or both.

15. A microarray or nanoarray having functionalized entities arranged on a substrate in a spatially addressable array and formed by a method comprising the following steps in the order of:
  i) providing a casting surface having a plurality of wells therein, each well having a well surface with a bottom;
  ii) depositing one or more beads in the bottom of each of some or all of the wells such that each bead is in contact with the well surface;
  iii) after the depositing one or more beads such that each bead is in contact with the well surface, pouring a casting material over the casting surface to cast the one or more beads in contact with the well surface onto the casting material and curing the casting material to form a reverse casting that includes a substrate and a plurality of posts upstanding from the substrate, each post defined by a respective one of the wells, the plurality of posts having a top and beads immobilized in the casting material at the top of the posts according to the deposition of the beads in the wells of the casting surface; and
  iv) separating the reverse casting from the casting surface to form a unitary bead microarray platform or bead nanoarray platform with the plurality of posts upstanding from the substrate.

16. The microarray or nanoarray of claim 15, wherein before, during or after the beads are immobilized in the casting material some or all of the beads are selectively chemically modified to provide one or more functionalities selected from the group consisting of interacting, reacting, binding, sensing, detecting, identifying and labeling.

17. The microarray or nanoarray of claim 16, wherein a spatial distribution of functionalized and unfunctionalized beads on posts in the array comprises a spatial code for identifying and reading the array.

18. The microarray or nanoarray of claim 15, wherein an elevation of beads on posts above the surface of the array enhances a detection signal-to-noise ratio of the array or its beads or both.

19. A bead immobilization method, comprising:
i) providing a casting surface having a plurality of wells therein, each well having a bottom;
ii) depositing one or more beads in the bottom of each of some or all of the wells;
iii) after the depositing one or more beads, pouring a casting material over the casting surface and curing the casting material to form a reverse casting that includes a substrate and a plurality of posts upstanding from the substrate, each post defined by a respective one of the wells and having a top, the plurality of posts having one or more beads immobilized in the casting material at the top of the posts; and
iv) after curing the casting material to form the reverse casting, separating the reverse casting from the casting surface to form a unitary bead microarray platform or bead nanoarray platform with the plurality of posts upstanding from the substrate.

20. The method of claim 19, wherein at least one bead, or at least one well, or at least one post or a combination thereof are functionalized with functions selected from interacting, reacting, binding, sensing, detecting, identifying, labeling, and combinations thereof.

21. The method of claim 20, wherein at least one bead and at least one post are functionalized and the at least one bead has a different functionalization from the at least one post.

22. The method of claim 19, wherein the at least one bead or the at least one well or both are functionalized before or during the casting step, and the at least one bead or at least one post or both are functionalized during or after the casting step.

* * * * *